US009774626B1

(12) United States Patent
Himler et al.

(10) Patent No.: US 9,774,626 B1
(45) Date of Patent: Sep. 26, 2017

(54) METHOD AND SYSTEM FOR ASSESSING AND CLASSIFYING REPORTED POTENTIALLY MALICIOUS MESSAGES IN A CYBERSECURITY SYSTEM

(71) Applicant: Wombat Security Technologies, Inc., Pittsburgh, PA (US)

(72) Inventors: Alan Himler, Pittsburgh, PA (US); John T. Campbell, Bridgeville, PA (US); Joseph A. Ferrara, Wexford, PA (US); Trevor T. Hawthorn, Ashburn, VA (US); Norman Sadeh-Koniecpol, Pittsburgh, PA (US); Kurt Wescoe, Pittsburgh, PA (US)

(73) Assignee: WOMBAT SECURITY TECHNOLOGIES, INC., Pittsburgh, PA (US)

( * ) Notice: Subject to any disclaimer, the term of this patent is extended or adjusted under 35 U.S.C. 154(b) by 0 days.

(21) Appl. No.: 15/239,668

(22) Filed: Aug. 17, 2016

(51) Int. Cl.
*H04L 29/06* (2006.01)

(52) U.S. Cl.
CPC ...... *H04L 63/1483* (2013.01); *H04L 63/1433* (2013.01); *H04L 67/42* (2013.01)

(58) Field of Classification Search
CPC .......................... H04L 63/1483; H04L 12/585
See application file for complete search history.

(56) References Cited

U.S. PATENT DOCUMENTS

| 6,324,647 | B1 | 11/2001 | Bowman-Amuah |
| 7,647,376 | B1 | 1/2010 | Jagger et al. |
| 7,921,063 | B1 * | 4/2011 | Quinlan ................. G06F 17/20 705/76 |
| 7,925,883 | B2 | 4/2011 | Florencio et al. |
| 7,971,246 | B1 | 6/2011 | Emigh et al. |
| 8,205,255 | B2 | 6/2012 | Benea et al. |
| 8,332,947 | B1 | 12/2012 | Bregman et al. |
| 8,392,357 | B1 | 3/2013 | Zou et al. |
| 8,468,244 | B2 | 6/2013 | Redlich et al. |

(Continued)

OTHER PUBLICATIONS

Burns, Mary B.; Durcikova, Alexandra; Jenkins, Jeffrey L.; "What Kind of Interventions Can Help Users from Falling for Phishing Attempts: A Research Proposal for Examining Stage-Appropriate Interventions", 46th Hawaii International Conference on System Sciences (HICSS), IEEE, Jan. 7-10, 2013, pp. 4023-4032.*

(Continued)

*Primary Examiner* — Victor Lesniewski
(74) *Attorney, Agent, or Firm* — Fox Rothschild LLP

(57) ABSTRACT

In a cybersecurity network, a system identifies and classifies non-malicious messages by receiving a user notification indicating that the user has reported a received message as potentially malicious message, and determining whether the received message is legitimate or potentially malicious. When the system determines that the message is a legitimate, it further analyzes the message to assign a class that may include trusted internal sender, trusted external sender, or training a simulated phishing message. It will then cause the user's device to provide the user with information corresponding to the assigned class. The system may also quarantine a received message and release the message from the quarantine only after determining that the message is legitimate and receiving a user acknowledgment.

24 Claims, 5 Drawing Sheets

(56) References Cited

U.S. PATENT DOCUMENTS

| | | | |
|---|---|---|---|
| 8,484,741 B1* | 7/2013 | Chapman | G06Q 10/0635 709/206 |
| 8,566,938 B1* | 10/2013 | Prakash | H04L 63/1483 726/22 |
| 8,615,807 B1* | 12/2013 | Higbee | G06Q 10/107 726/22 |
| 8,635,703 B1* | 1/2014 | Belani | H04L 63/1433 726/22 |
| 8,793,799 B2* | 7/2014 | Fritzson | G06F 21/577 709/206 |
| 8,910,287 B1* | 12/2014 | Belani | H04L 63/1483 726/23 |
| 9,027,134 B2 | 5/2015 | Foster et al. | |
| 9,065,826 B2 | 6/2015 | Colvin et al. | |
| 9,118,702 B2 | 8/2015 | MaCaulay | |
| 9,143,476 B2* | 9/2015 | Dreller | G06Q 10/04 |
| 9,143,529 B2 | 9/2015 | Qureshi et al. | |
| 9,154,514 B1* | 10/2015 | Prakash | H04L 63/1483 |
| 9,253,207 B2 | 2/2016 | Higbee et al. | |
| 9,262,629 B2 | 2/2016 | Belani et al. | |
| 9,280,911 B2 | 3/2016 | Sadeh-Koniecpol et al. | |
| 9,356,948 B2 | 5/2016 | Higbee et al. | |
| 9,373,267 B2 | 6/2016 | Sadeh-Koniecpol et al. | |
| 9,398,038 B2 | 7/2016 | Higbee et al. | |
| 9,501,746 B2* | 11/2016 | Prakash | H04L 63/1483 |
| 9,667,645 B1* | 5/2017 | Belani | H04L 63/1433 |
| 2003/0009698 A1 | 1/2003 | Lindeman et al. | |
| 2004/0107345 A1 | 6/2004 | Brandt et al. | |
| 2005/0183143 A1 | 8/2005 | Anderholm et al. | |
| 2005/0257261 A1 | 11/2005 | Shraim et al. | |
| 2006/0004896 A1 | 1/2006 | Nelson et al. | |
| 2006/0168066 A1 | 7/2006 | Helsper et al. | |
| 2006/0206713 A1* | 9/2006 | Hickman | H04L 51/12 713/176 |
| 2007/0005702 A1 | 1/2007 | Tokuda et al. | |
| 2007/0027992 A1* | 2/2007 | Judge | G06Q 10/107 709/227 |
| 2007/0112814 A1* | 5/2007 | Cheshire | G06F 17/30876 |
| 2007/0271613 A1 | 11/2007 | Joyce | |
| 2008/0222728 A1 | 9/2008 | Chavez et al. | |
| 2008/0244715 A1 | 10/2008 | Pedone | |
| 2009/0089859 A1 | 4/2009 | Cook et al. | |
| 2009/0158430 A1 | 6/2009 | Borders | |
| 2009/0241168 A1 | 9/2009 | Readshaw | |
| 2010/0138925 A1* | 6/2010 | Barai | H04L 63/1433 726/25 |
| 2010/0146615 A1 | 6/2010 | Locasto et al. | |
| 2010/0211641 A1 | 8/2010 | Yih et al. | |
| 2010/0313266 A1* | 12/2010 | Feng | G06F 21/566 726/23 |
| 2010/0317319 A1* | 12/2010 | Gorman | H04L 63/12 455/410 |
| 2010/0318614 A1* | 12/2010 | Sager | G06Q 10/107 709/206 |
| 2011/0119258 A1* | 5/2011 | Forutanpour | G06Q 10/107 707/723 |
| 2011/0167011 A1 | 7/2011 | Paltenghe et al. | |
| 2012/0066498 A1 | 3/2012 | Engert | |
| 2012/0124671 A1* | 5/2012 | Fritzson | G06F 21/577 726/26 |
| 2012/0278887 A1 | 11/2012 | Vitaldevara et al. | |
| 2013/0232576 A1 | 9/2013 | Karnikis et al. | |
| 2014/0082726 A1 | 3/2014 | Dreller et al. | |
| 2014/0157405 A1 | 6/2014 | Joll et al. | |
| 2014/0199663 A1 | 7/2014 | Sadeh-Koniecpol et al. | |
| 2014/0199664 A1 | 7/2014 | Sadeh-Koniecpol et al. | |
| 2014/0201836 A1 | 7/2014 | Amsler | |
| 2014/0230061 A1 | 8/2014 | Higbee et al. | |
| 2014/0259158 A1* | 9/2014 | Brown | G06F 21/554 726/22 |
| 2015/0067833 A1* | 3/2015 | Verma | H04L 63/1483 726/22 |
| 2015/0287336 A1* | 10/2015 | Scheeres | G09B 19/0053 434/156 |
| 2016/0057167 A1* | 2/2016 | Bach | H04L 63/101 726/23 |
| 2016/0119376 A1* | 4/2016 | Scozzaro | H04L 63/168 726/22 |
| 2016/0301705 A1* | 10/2016 | Higbee | H04L 63/1416 |
| 2016/0308897 A1 | 10/2016 | Chapman | |
| 2016/0330238 A1 | 11/2016 | Hadnagy | |
| 2016/0337401 A1* | 11/2016 | Bendersky | H04L 63/1483 |
| 2016/0344770 A1* | 11/2016 | Verma | H04L 63/1483 |
| 2017/0026393 A1* | 1/2017 | Walsh | G06F 21/128 |
| 2017/0085584 A1* | 3/2017 | Goutal | H04L 63/1483 |
| 2017/0195293 A1* | 7/2017 | Dahan | H04L 63/1483 |
| 2017/0195363 A1* | 7/2017 | Dahan | H04L 63/1483 |

OTHER PUBLICATIONS

Jansson, Kenny; von Solms, Rossouw; "Simulating Malicious Emails to Educate End Users on-Demand", $3^{rd}$ Symposium on Web Society (SWS), IEEE, Oct. 26-28, 2011, pp. 74-80.*

Kumaraguru, Ponnurangam; Sheng, Steve; Acquisti, Alessandro; Cranor, Lorrie Faith; Hong, Jason; "Lessons From a Real World Evaluation of Anti-Phishing Training", eCrime Researchers Summit, IEEE, Oct. 15-16, 2008, 12 pages.*

U.S. Appl. No. 15/239,655, filed Aug. 17, 2016, Method and System for Reducing Reporting of Non-Malicious Electronic Messages in a Cybersecurity System.

U.S. Appl. No. 15/239,688, filed Aug. 17, 2016, Advanced Processing of Electronic Messages With Attachments in a Cybersecurity System.

"Advanced Spam Filtering Options," Microsoft Exchange Online Help, posted at https://technet.microsoft.com (Jun. 26, 2015).

Microsoft, "Prevent False Positive of Email Marked as Spam with a Safelist or Other Techniques," posted at httpr://support.office.com, accessed Jun. 6, 2016.

Graves, "Phishing Defenses for Webmail Providers," the SANS Institute Jan. 20, 2013.

Trevino, "Spam Filtering Through Header Relay Detection," Brigham Young University, Mar. 2007.

Handl, Thesis: "Spam Identification Independent of Body Contents," Czech Technical University in Prague, Jan. 5, 2010.

Parno et al., "Phoolproof Phishing Prevention", Carnegie-Mellon University, Dec. 3, 2005.

Information about Related Patents and Patent Applications, see section 6 of the accompanying Information Disclosure Statement Letter, which concerncs Related Patents and Patent Applications.

Burri, N., Thesis: "Spamato, a Collaborative Spam Filer System" Swiss Federal Institute of Technology Zurich, Nov. 4, 2003.

Schlachter, S., Thesis: "Spamato Reloaded, Trust, Authentication and More in a Collaborative Spam Filter System" Swiss Federal Institute of Technology Zurich, Feb. 18, 2004.

Wombat Security Technologies, Inc., "Leading Computer Science University Takes Multi-Pronged Approach to Combat Phishing; Deploys Wombat Security's Highly Effective Suite of Training and Filtering Products" dated Mar. 10, 2011, available at: https://www.wombatsecurity.com/press-releases/leading-computer-science-university-takes-multi-pronged-approach-combat-phishing.

Wombat Security Technologies, Inc., "Case Study: Carnegie Mellon Univiersity—A Multi-Pronged Approach to Combat Phishing" dated Mar. 2011.

Wombat Security Technologies, Inc. "PhishGuru Phishing Attack Simulation Service" May 2012.

Wombat Security Technologies, Inc., "An Empirical Evaluation of Phishguru™ Embeded Traning" dated Apr. 2009.

Wombat Security Techonologies, Inc., "PhishGuru: Operations Manual" dated Aug. 30, 2010.

Wombat Security Technologies, Inc., "PhishPatrol—A Purpose-built Filter to Catch Those Crafty Spear Phishing Emails That Make It Past Other Email Security" dated Apr. 2012.

Wombat Security Technologies, Inc., "PhishPatrol™ SpamAssassin Plugin Operations Manual" dated May 1, 2011.

(56) References Cited

OTHER PUBLICATIONS

Wombat Security Techonologies, Inc., "Anti-Phishing Phyllis Training Game, Teaches Employees How to Identify Traps in Emails" dated 2011.
Wombat Security Technologies, Inc., "Anti-Phishing Phyllis™ Instructions" dated 2010.
Rashid, F. Y., "Review of Wombat Security Technologies PhishGuru™" PCMag.com, dated May 16, 2014, available at http://uk.pcmag.com/security-reviews/53269/news/phishguru.
Albrecht, K., Dissertation: "Mastering Spam a Multifaceted Approach with the Spamato Spam Filter System" submitted to the Swiss Federal Institute of Technology Zurich, dated 2006.
Fette et al., "Learning to Detect Phishing Emails", World Wide Web Conference Committee, May 8-12, 2007, Banff, Alberta, Canada.

* cited by examiner

METHOD AND SYSTEM FOR ASSESSING AND CLASSIFYING REPORTED POTENTIALLY MALICIOUS MESSAGES IN A CYBERSECURITY SYSTEM

BACKGROUND

This disclosure relates to methods and systems for reducing reporting of non-malicious electronic messages in cybersecurity protection elements of a communication network.

Cybersecurity protection systems that enable end users to report malicious emails improve a company's ability to detect, assess and remediate email threats. The challenge is that, often times, end users report both malicious emails and non-malicious emails, like those originating from internal networks and trusted business partners. These reported non-malicious messages will cost businesses time and money, and cause overhead in processing non-malicious electronic messages unnecessarily. As such, there is a need to reduce reported non-malicious electronic messages, to save time and money, to enable an organization to set non-malicious email senders preemptively, and to provide guidance to the user based on the analysis of the email.

This document describes devices and methods that are intended to address at least some issues discussed above and/or other issues.

SUMMARY

In one embodiment, a non-malicious message identification and classification system of a cybersecurity network may include a cybersecurity server that includes a processor that can generate simulated phishing messages and send the simulated phishing messages to a client computing device. The system may include programming instructions that may execute on a client computing device and that cause the client computing device to receive an electronic message via a communications network, receive a user notification that indicates that the user has reported the received message as a potentially malicious message, and determine whether the received message is a legitimate message or a potentially malicious message. In response to determining that the received message is a legitimate message, the client computing device may further analyze the received message to assign a class from a set of available classes to the received message. In one embodiment, the client computing device may also prompt the user of the assigned class to the received message. In one embodiment, the available classes may include at least two of the following: a trusted internal sender, a trusted external sender, or a simulated phishing message.

In one embodiment, a method for determining whether a received message is a legitimate message or a malicious message may include selecting a structural element of the received message, obtaining information corresponding to the structural element, and using the obtained information to assign a trust value to the structural element. The method may also include training the user about how the structural element can help identify whether the received message is a legitimate message by presenting the user with the structural element and description material corresponding to the obtained information corresponding to the structural element. There may be various ways to obtain information corresponding to a structural element. If the structural element includes a hyperlink, the method may access a domain name registrar to retrieve information that indicates an age of a domain associated with the hyperlink. The method may also identify a domain name registrar for a domain associated with the hyperlink, and access a data set of known domain name registrars to identify whether the registrar is known to register malicious websites. The method may also determine a number of redirects associated with the plurality of hyperlinks, if the structural element includes a plurality of hyperlinks.

In one embodiment, the method for assigning a received message to a class may include assigning the simulated phishing message class to the received message if the received message is one of the simulated phishing messages generated by the cybersecurity server. In one embodiment, the method may include determining that a received message is one of the simulated phishing messages if a header field of a header section of the received message starts with a predetermined key; and for any header field that starts with the predetermined key, that header field also includes a value that satisfies one or more trusted sender rules. In one embodiment, a trusted sender rule may include at least a condition. The condition may include whether at least one header field of a header section of the received message starts with a predetermined key, and for any header field that starts with the predetermined key, that header field also includes a value that is a predetermined known value or is in a predetermined known format. The condition may include a condition that any header field having a FROM fieldname include a value that is associated with a known sender; a condition that any header field having a domain name include a value that is associated with a known domain; a condition that any header field having a FROM fieldname include a value that is associated with a known sender; or a combination of these conditions.

In one embodiment, the programming instructions installed on the client computing device may also cause the client computing device to, before determining whether the received message is a legitimate message or a potentially malicious message, quarantine the received message; and release the received message from quarantine only after determining that the received message is a legitimate message and receiving a user acknowledgment of the prompt.

DETAILED DESCRIPTION

Figure 1:
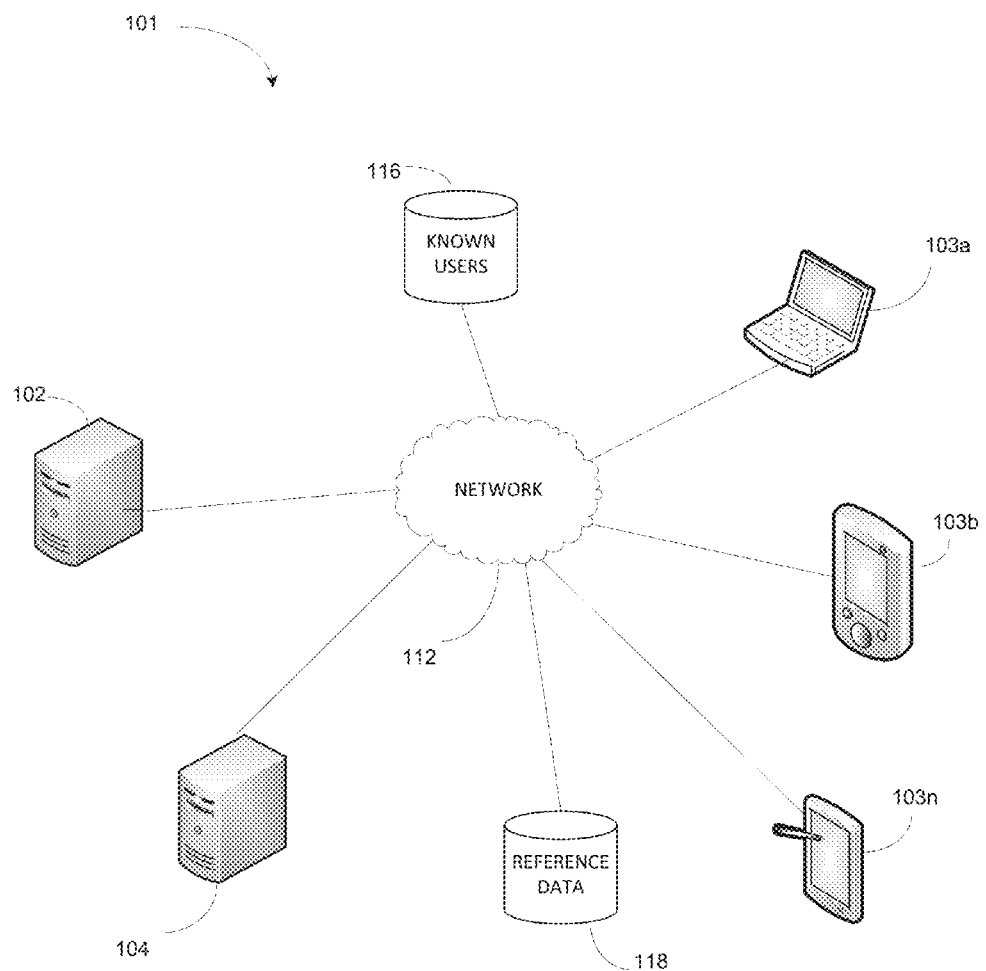
FIG. 1 depicts a cybersecurity network according to an embodiment.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used in this document have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

For the purposes of this document, the terms "electronic device" and "computing device" interchangeably refer to a device or system of one or more devices that includes at least one processor and non-transitory, computer-readable memory. The memory may contain programming instructions that, when executed by the processor, cause the device to generate, receive or analyze messages according to the programming instructions. Examples of computing devices include networked servers, personal computers, gaming systems, televisions and other electronic display devices, wearable electronic devices (such as smart watches and activity bracelets), electronic devices configured to connect to each other in a network (as in an Internet of Things arrangement) network infrastructure devices (such as servers, routers, switches, and the like), as well as Internet of Things devices and systems (such as sensors, virtual sensors, controllers, actuators, building management systems, robots, intelligent transportation systems, smart grids, smart cars, drones, and the like), implantable electronic devices, and portable electronic devices such as smartphones, personal digital assistants, cameras, tablet computers, laptop computers, media players and the like.

Where appropriate for the context, the term "electronic device" or "computing device" also may refer to a software application configured to operate on an electronic device, or firmware that is installed in an electronic device. In some embodiments, specialized electronic devices other than general purpose computing devices may be used. Examples include a smartphone having a transceiver that may send and receive messages via wireless communications capability; a computing device having a wireless network transceiver that can connect to and exchange communications with other devices via a wireless network access device; a media player; a wearable electronic device such as a smart watch or smart eyewear having a processor, display and user interface; and the like.

When used in this document, the term "processor" refers to logic circuitry that is configured to implement programming instructions that cause an electronic device to perform various functions. Unless specifically stated otherwise, the term "processor" can refer to a single processing device or to multiple processing devices that together implement various steps of a process.

The terms "memory," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

In this document, the term "mock malicious message" refers to a message containing one or more elements that are configured to test, train or assess an electronic user's adherence to safe cybersecurity practices. Mock malicious messages will be simulated malicious messages that contain one or more elements that may be found in actual malicious messages. These elements are designed to lure the user into performing an action that can compromise the user's or a network's security and/or allow a third party to access sensitive information about the user or the user's organization. Examples of mock malicious messages include: simulated phishing emails or text messages; spoofing messages that appear to originate from a known entity or an official entity (such as a government agency or financial institution); emails containing mock malicious executable or other mock malicious attachments; and/or other electronic messages containing a prompt intended to lure the user to initiate an action on the user's device that could compromise system or data security if the message were actually malicious. Examples of such actions include, and are not limited to, clicking a mock malicious hyperlink, opening a mock malicious attachment, calling a mock malicious number, or otherwise disclosing sensitive information.

In this document, the term "trusted entity" or "trusted sender" refers to a person or system that is known to or considered by the user, to the user's messaging client, or to a cybersecurity analyzer server as an entity that is highly unlikely to send an actual malicious message to the user. Examples of trusted entities include those having an address or address components that appear on a whitelist of trusted entities, or entities that are part of an organization to which the user belongs (such as a company or group of affiliated companies).

In this document, the term sender policy framework (or SPF) refers to a Domain Name System (DNS) text entry which shows a list of servers that are considered to be permitted to send messages for a specific domain. SPF is a DNS entry and can also considered a way to enforce the fact that the list is authoritative for the domain, since an entity's administrators may the only people allowed to add/change that list's domain entries.

In this document, the term Domain Keys Identified Mail (DKIM) refers to an email authentication method designed to allow the email receiver to check that an email claimed to come from a specific domain was indeed authorized by the owner of that domain. This is achieved by an implementation of a public/private key signing process. The embodiments of this document encompass both DKIM as it is known at the time of this filing and future updates to the DKIM method that become generally accepted in the art.

In this document, the term Domain-based Message Authentication, Reporting & Conformance (DMARC) refers an email authentication protocol, and represents a collection of techniques that are designed to verify the identity of a sender of a message. DMARC may utilize the SPF and DKIM protocols and adds a reporting and policy function that allows senders and receivers to review if the mail messages adhered to the attributes of a specific domain. The embodiments of this document encompass both DMARC as it is known at the time of this filing and future updates to the DMARC method that become generally accepted in the art.

In this document, the term "malicious message" refers to a message containing an actuatable element that, if actuated by a recipient of the message, can put the recipient or the recipient's organization at risk by harming computer networking equipment, destroying or altering stored data, transmitting stored data or otherwise making the data accessible to a third party, causing the recipient's messaging client to automatically forward the message or generate and send other malicious messages to the recipient's contacts, or taking some other action that compromises network, data or network-connected device security. Such actuatable elements can include (1) attachments that, if opened or selected, will cause the user's computing device to execute a malicious action; (2) hyperlinks to websites or Internet addresses that contain malicious functions (such as functions that invite the recipient to enter login credentials or disclose other sensitive information while appearing to be a legitimate website, functions that cause malware to be downloaded to the recipient's electronic device, or functions that prompt the recipient to carry out some action that will compromise system or data security).

Conversely, a legitimate or non-malicious message is a message that is not malicious. The determination that a message is non-malicious (or legitimate) may be the result of an automated analysis, including an analysis to determine whether the sender of the message is a trusted sender, or whether the message is a mock malicious message, or it may be the result of a more comprehensive analysis that looks at a broader set of attributes associated with a message (e.g., detection of malware in an attachment, detection of malicious hyperlinks in a message, age of the domains associated with hyperlinks in a message, reputation of the registrar associated with different hyperlinks in a message, language used in the message, etc.).

With reference to FIG. 1, in one embodiment, a cybersecurity network 101 may include a message origination server or a cybersecurity server 102, one or more client computing devices 103a . . . 103n, and a cybersecurity analyzer server 104. The message origination server 102 is a computing device that includes a processor and programming instructions that are configured to cause the processor to generate or select and send one or more mock malicious messages to one or more of the client devices via one or more wired or wireless networks 112. The mock malicious messages may be simulated phishing emails, and/or other electronic messages (such as emails, short messaging service or SMS, MMS, instant messages, in-channel messages delivered by a service such as a social networking site, or electronic messages delivered using some other messaging technology) containing a prompt intended to lure the user to click a mock malicious hyperlink, open a mock malicious attachment, call a mock malicious number, disclose sensitive information, or otherwise carry out (or not carry out) an action whose performance (or non-performance) would put systems or data of the user or the user's organization at risk. The cybersecurity analyzer server 104 is a computing device with processor and programming instructions that are configured to enable the server to receive, process, classify and forward messages that it receives from client computing devices.

In various embodiments, the cybersecurity analyzer server 104, the message origination server 102, or both may have access to a user database 116 containing identifying information about one or more users of the system that may receive messages and report the messages to the cybersecurity analyzer server. Information in the user database may include a message delivery address (e.g., email address), social media account information, mobile device phone number, or the like. The system may also include or have access to one or more remote or client-installed data sets of reference data 118 that the cybersecurity analyzer server or a client computing device may access when analyzing and classifying messages. The reference data may include trusted senders, messages or message components previously received from trusted senders, domain registrar information, or other information, examples of which will be described in more detail below.

Each client computing device (e.g., 103a) includes a messaging client that receives electronic messages, including but not limited to the mock malicious messages originating from the message origination server 102, and presents the messages to the user for review via a user interface. Examples of messaging clients include e-mail clients, SMS messaging clients, social media messaging applications, or other client applications that receive and display messages for the device's user to review.

The client computing device 103a receives the mock malicious messages from the message origination server and may decide to respond to one or more mock malicious messages by receiving a user notification from the end user, where the user notification indicates that the user has reported a malicious message in response to receiving the one or more mock malicious messages. In one embodiment, the client computing device 103a may be configured to analyze the user notification and determine whether the user reported message is a malicious message. In another embodiment, the client computing device 103a may also send the user notification to the cybersecurity analyzer server 104 or another remote network device for analysis. The transmitted user notification may also be accompanied by the reported potentially malicious message.

Figure 4:
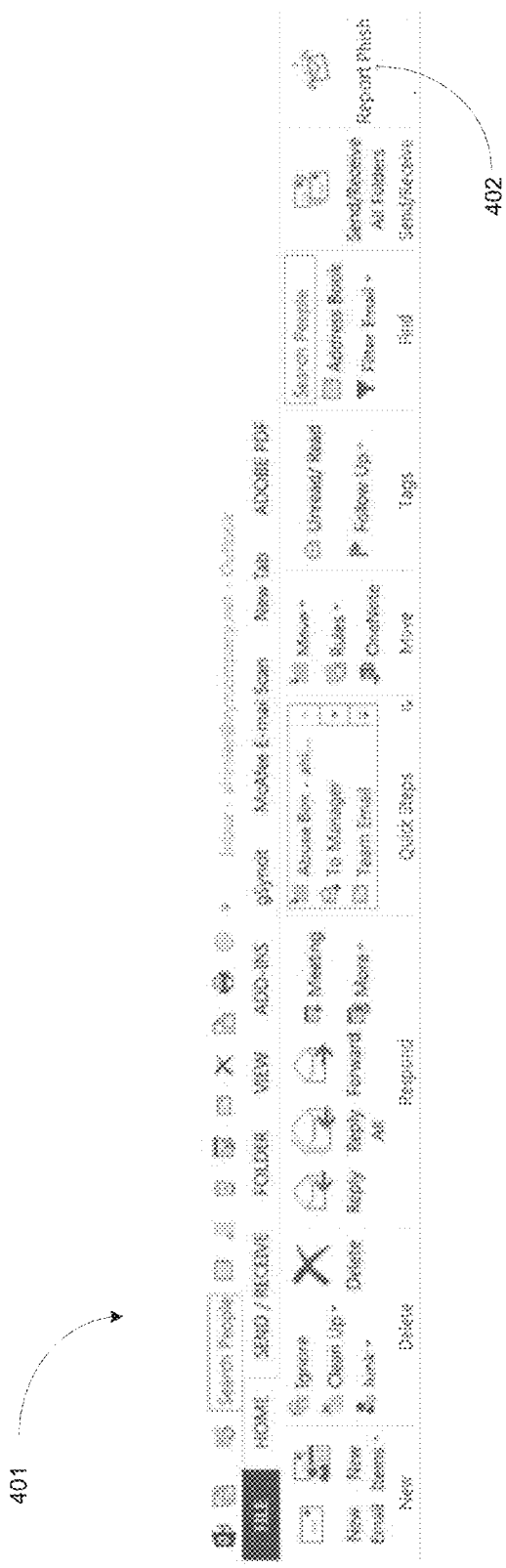
FIG. 4 depicts an example of various components of a messaging client on a client computing device.

In one embodiment, the messaging client on the client computing device may include a reporting function that enables a user of the messaging client to report a potentially malicious message to the cybersecurity analyzer server 104. The reporting function may be a message forwarding feature that forwards the potentially malicious message to a predetermined address where the message will be received by the cybersecurity analyzer server 104. This may be implemented as, for example, a reporting button as a plug-in in an email tool such as Outlook (a trademark of Microsoft) or other messaging client's toolbar, a selectable option in the messaging client's actions menu (e.g., the menu that includes message forward, reply, and similar functions), or in some other way. An example of this is shown in FIG. 4, which illustrates a toolbar 401 of a messaging client, with a user-selectable reporting button 402 which, when actuated by a user, will cause the messaging client to process a highlighted or otherwise selected message.

Returning to FIG. 1, when actuated by a user, the user-selectable reporting button will cause the messaging client to generate a user notification indicating that the user has reported a malicious email, will cause the messaging client to analyze the email, and may forward a highlighted or otherwise selected email to a cybersecurity analyzer server 104 or other remote network device. In some embodiments the reporting functionality may also allow the user to explicitly flag elements of the message the user views as malicious. For instance, in one embodiment the system may receive input from the user indicating that a link in the body of the message is suspicious. In another embodiment, the system may receive a user's request that, rather than submitting the full message to inspection, the system simply inspect one or more elements of the message such as a particular link in the body of a message. Once the analysis is completed, whether at the level of the client computing device or a remote computing device or a combination of both, the client device may output feedback to the user focusing specifically on those elements flagged by the user and explaining to the user why he or she was correct/incorrect in flagging a particular element of the message, as further detailed below.

When the messaging client on the client computing device (e.g. 103a) analyzes a user-reported suspicious message, the client computing device may determine whether the reported message is from a trusted sender. If the system determines that the reported message is not from a trusted sender, it may send the user a notification and/or a portion (e.g., the message's header, body and/or attachment) or the entire reported message to a remote device on the network for analysis. If the system determines that the reported message is from a non-malicious or trusted sender, it may prompt the user with a message confirming that the reported message is from a non-malicious or trusted sender and prompt the user to confirm reporting of the malicious message and/or it may allow the user to proceed with taking action on the reported message without forwarding or further reporting the message to the cybersecurity analyzer server 104. In this way, reporting of non-malicious messages may be reduced without comprising the security of the network. Details of various embodiments will be further explained in this document.

The messaging client also may be configured to further process the reported message to determine whether the trusted sender was an internal sender or an external sender. Details of this will be described below. More generally, the analysis of user-reported messages can extend to the determination of whether the email is malicious or not, independently of whether it originates from a known trusted sender. This analysis may be performed at the level of the client computing device running the messaging client, or it may be performed at the level of a server, or a combination of both. It may also involve accessing one or more internal and external sources of information such as information from domain registrars, blacklists, servers maintaining reputation information, malware repositories (including repositories of malware signatures), caches storing some of this information or pre-computed metrics intended to facilitate the detection of malicious and legitimate messages (e.g. signatures of known malicious messages, who-is data, statistics about the number of hyperlinks found in different types of malicious and legitimate messages, reputation of different domain registrars, etc.) Examples of how the system may use this information will be described below.

Figure 2:
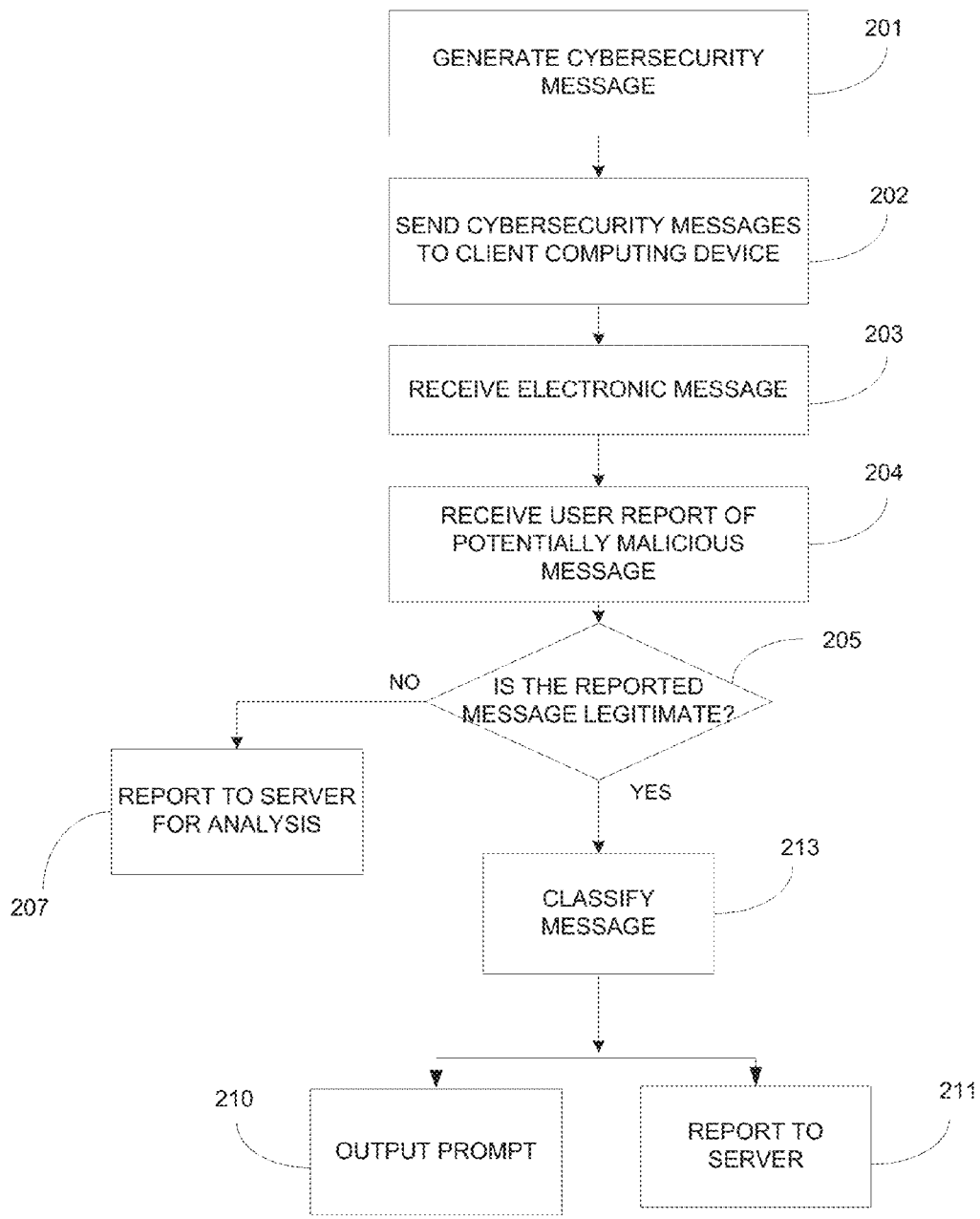
FIG. 2 is a flow diagram illustrating various actions that the system may take to reduce the reporting of non-malicious cybersecurity messages according to various embodiments.

With reference to FIG. 2, in an embodiment, a method implemented in a system described in FIG. 1 may include generating mock malicious messages by a cybersecurity server 201, sending the mock malicious messages to one or more client computing devices 202, receiving an electronic message by a client computing device 203, receiving, by the client computing device, a user notification that indicates that the user has reported the received message as a potentially malicious message 204, and determining whether the reported message is legitimate, such as by being one of the mock malicious messages generated by the message origination server 205. If the client computing device determines that the reported message is not a known mock malicious message or otherwise legitimate, it may report to a remote device or the cybersecurity analyzer server on a network for analysis 207. In one embodiment, the report may include the user notification and/or the body of the reported message. If the client computing device determines that the reported message is one of the mock malicious messages or otherwise legitimate, it may output a prompt to the user, such as by displaying a message confirming that the reported message is from a non-malicious or trusted sender 210. In one embodiment, the client computing device may prompt the user to confirm whether the user wants to continue reporting the message, or prompt the user to proceed with the reported message without further reporting the message to the remote cybersecurity analyzer server.

Optionally, before generating the prompt, the client computing device may classify the reported message 213 using rules such as those that will be described below in order to assign a class to the message. It should be noted that these rules may be handcrafted or may be derived using statistical analysis techniques or machine learning techniques (e.g., using a corpus of both known malicious messages and known legitimate messages to train models that differentiate between both malicious and legitimate messages), or a combination of both. The class may be a label that identifies the message as being from an internal sender, a trusted external sender, or an unknown or potentially malicious sender, or of another class.

Other examples of classes may further distinguish between different types of legitimate messages and/or different types of malicious messages such as: (1) a malicious phishing message that appears to be from the IRS; (2) a malicious message trying to entice a user with an offer that it is too good to be true; (3) a malicious message requesting the user to disclose sensitive information (such as entering login credentials for an account); (4) a malicious message disguising a malicious URL as a trustworthy URL; (5) a message with a malicious attachment, (6) a legitimate message from a particular known entity such as the recipient's system administrator, a legitimate message from a bank or entity with which the recipient has an account, or a legitimate message from a company vendor or customer; or (7) a legitimate message from an unknown entity but which, based on content analysis, is determined to be a simulated malicious message, or to have originated from a trusted source.

When displaying the prompt to the user 210, the prompt may identify the class or stored information corresponding to the identified class so that the user knows and can learn the class to which the message actually was assigned. The classes may include trusted and originating from a source that is internal to the user's organization or the cybersecurity analysis system's organization, trusted and originating from an external organization, untrusted (i.e., unknown and potentially malicious, or known to be malicious), unknown but not expected to be malicious, etc. Optionally, if the user highlighted or selected one or more particular elements of the message, the prompt may include information about those elements based on analyses as described below.

Optionally, the client computing device may also send a report to a remote server or the cybersecurity analyzer server 211. Optionally, the report may indicate that the user has reported a potentially malicious message and that the client computing device has determined that the reported message is a known mock malicious message generated by the cybersecurity server.

Optionally, when a user reports a potentially malicious message, the client computing device may quarantine the message until the system's analysis is complete. This may be done by removing the message from the user's messaging client inbox, masking the message in the messaging client, or adjusting a setting of the messaging client so that the user cannot open the message. If the message is determined to be potentially malicious, the client computing device may delete the message after sending it to the cybersecurity analyzer server. If the message is determined to be legitimate, the client computing device may release the message from quarantine and make it available to the user again. Optionally, the release from quarantine may occur only after the user has responded to the prompt, such as by clicking a button or taking some other action indicating acknowledgement of the prompt.

Figure 3:
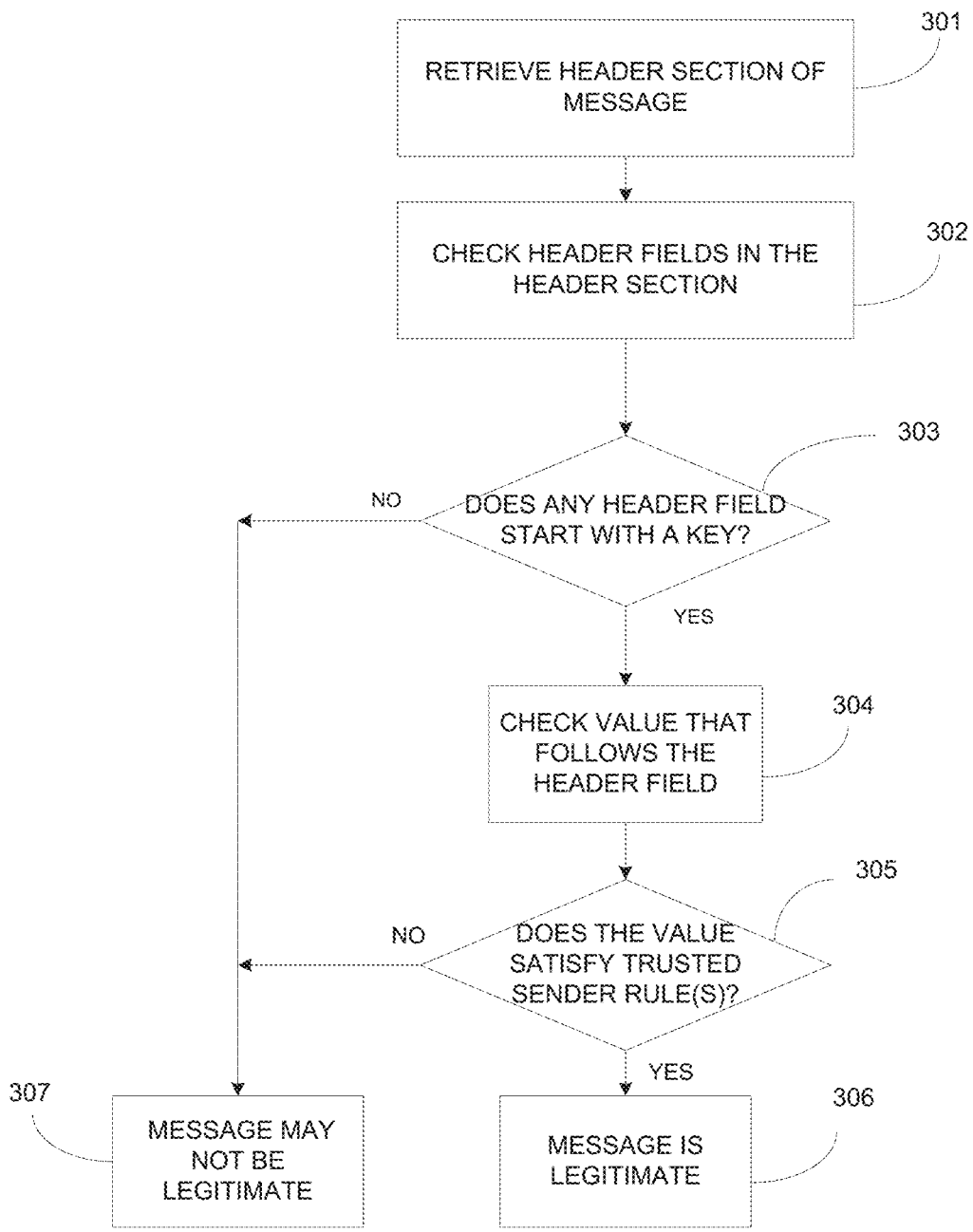
FIG. 3 illustrates various actions that the system may take to determine whether a reported message is a mock malicious message according to various embodiments.

With reference to FIG. 3, in one embodiment, the method of determining whether a user-reported message is a known mock malicious message may include retrieving one or more header fields (which may include an actual header field and/or an identifier within a header) of a header section of the message 301, checking the one or more header fields 302, determining whether any header field of a header section of the received message starts with a predetermined key 303, and if a header field starts with the predetermined key, further checking the value that follows the header field 304, determining whether the value that follows the predetermined key satisfies a trusted sender rule 305. If the value that follows the header field satisfies the trusted sender rule, determining that the message is a mock malicious message 306; otherwise, determining that the message is not a known mock malicious message 307. If the system determines that no header field of any header section of the received messages starts with any predetermined key, it may also determine that the message is not a known mock malicious message 307.

Returning to FIG. 1, in one embodiment, the cybersecurity server or message origination server 102 may be a simulated phishing message server, in which case the mock malicious message is a simulated phishing message. For example, the message origination server can be an anti-phishing education system that assesses and trains employees utilizing simulated phishing emails. It can be configured to allow enterprise users to send very realistic mock phishing emails to their employees. The instant an employee falls for the mock phishing email the cybersecurity server creates a teachable moment when the employee is open to learning. The system may leverage this moment by providing just-in-time training on what the employee did wrong, and how they can recognize and avoid future malicious attacks. The training messages can be customized to capture attributes associated with different categories of malicious and legitimate messages such as those recognized by the message classification process disclosed earlier in this document.

In one embodiment, the phishing messages may contain one or more headers each containing various header fields and values to be used by the computing device (either on server or client device) to process the phishing message. For example, the phishing message server may generate simulated phishing emails with a key-value pair that consists of the phrase "X-Mailer: Known Mailer" in which X-Mailer is the key and Known Mailer is the value. In other examples, the phishing message server may generate simulated phishing emails, each of which includes key-value pairs that include a known key followed by a globally unique identifier (GUID), where the GUID is unique to the user to whom the message was sent, unique to the sender, which has a predetermined known format, or which is paired with one or more additional GUIDs that satisfy one or more of these rules.

In one embodiment, the client computing device may implement various functions in an email plug-in, such as an integrated Outlook (a registered trademark of Microsoft) plug-in, which will allow an employee or an email recipient to identify a potential phishing attack and report the potential phishing attack via a network. In one example, the client email plug-in can appear on the client user interface of the email application, such as Outlook, as an email reporting button. The email reporting button will give the email recipient/user the ability to report suspected phishing emails to a security and incident response team. The phishing email client can automatically provide positive behavior reinforcement by immediately providing the user with a notification that will be distinctly associated with the class of message to which the classifier assigned the message.

In one embodiment, in determining whether a user-reported message is a known mock malicious message generated by the cybersecurity message server, the client may look for one or more specific keys in the header and extract the values associated with each key. For example, if the value associated with an "X-Mailer" key is "Known Mailer," a known GUID, or a GUID of a known format, the client device may conclude that the email is a training message or simulated malicious message generated by the cybersecurity message server.

Alternatively, and/or additionally, the email plug-in or programming instructions on the client computing device may be configured to determine whether a user reported message is from a trusted source. In one embodiment, a trusted source may be an internal trusted sender, a trusted external sender, or an unknown external sender, and various characteristics may be examined for messages from different types of sources. For example, one or more of the following identifying characteristics will be examined for a designation of a trusted internal sender, such as an internal email, a X-header, the "From" header field, a domain name and an email body identifier.

In one embodiment, the content of an email message can embed an email body identifier that can be a unique identifier of the sender. For example, the identifier could take the form of an alphanumeric unique identifier, e.g. a Known ID, placed into one or more of the mime parts of the email. The presence of this unique identifier would mean the email is considered coming from a trusted source.

Some embodiments could classify the message or determine whether or not it originated from a trusted sender by performing one or more analyses on the content of one or more of the mime parts of the message body. As an example, the system may compare the text of a message body to the text of message bodies from trusted senders and analyze how similar they are. The system may do this using any now or hereafter known comparing techniques, such as hashing, probabilistic hashing, or vector space models. The system may assign a similarity score based on the analysis and consider the message to be trusted if it as a similarity score of at least a threshold amount when compared to a trusted message. In some embodiments, a comparison and similarity score may be verified by another type of analysis, or another type of analysis may be used instead of a direct comparison.

An example of another type of analysis involves using statistical linguistic analysis to train classifiers to automatically identify linguistic elements indicative of malicious messages. Examples of such linguistic elements include lures such as promise of rewards (e.g. "win a free trip", "congratulations you have won an iPhone"), threats (e.g. "your account will be disabled", "your pictures will be deleted", "your account will be delinquent"), calls to action (e.g, "change your password", "enter your credit card details"), time critical elements (e.g., "change your password by tomorrow or your account will be disabled"). Training of such models can be done using a corpus of both legitimate and malicious messages where these linguistic elements have been manually labeled. Messages in the corpora can be pre-processed with tokenization techniques, removal of "stop words", stemming, "Term Frequency/Inverse Document Frequency" (or TF-IDF) and other relevant pre-processing techniques.

In some embodiments statistical linguistic analysis techniques rely on simple logistic regression models. In other embodiments, they rely on more sophisticated statistical inference techniques to build classifiers, including techniques such as Bayesian inference techniques (e.g. Naïve Bayes), Support Vector Machines, Decision Tree Learning techniques (e.g., decision tree algorithms such as C4.5, ID3, Conditional Inference Trees and the like, or ensemble methods such as random forests, bagging, boosted trees and the like). These supervised learning models can also be further enhanced using boosting techniques and the use of unsupervised learning techniques (e.g. Topic Modeling and use of Latent Dirichlet Allocation). In other embodiments, some elements of the learned models can be developed using deep learning techniques. These statistical linguistic analysis techniques can also be further enhanced with semantic parsing techniques and other natural language processing techniques and classifiers trained to recognize patterns of linguistic elements indicative of malicious or legitimate messages.

Results can also be used to provide feedback to users who reported a malicious message and help them better understand why ultimately the message was determined to have or not have the linguistic attributes typical of malicious messages (e.g. "The message you reported did indeed look malicious as it included an offer, namely to win a free trip, a call to action, namely a request for your credit card credentials, and a time critical element in the form of a 24 hour deadline"). The system can generate such messages automatically using one or more templates (e.g. "the message you reported did indeed look malicious as it included the following elements" <if linguistic element indicative of offer was detected, insert this element here and "(lure in the form of an offer)">, <insert linguistic element indicative of call to action here and "(call to action)">, <if time critical element was detected, insert time critical element here and "(a deadline to entire you to act promptly)">.

Yet another type of analysis can rely on rules that look at one or more structural (or non-linguistic) features of a message. In some embodiments, the system may create a score using the value of any of all of these features. These values may be categories, numbers or, where the score is created using a sum of the values (when the values are numerical), a weighted sum of the values (in which some values are adjusted up or down by a weighting factor), or use a value generated based on some other function that takes the feature values as input. The features may include any or all of the following, as well as other features:

Factor 1: Age of the (Web) domains found in the body of a message. The system may access a domain registrar service or a database of known domain registrations and issue a service call requesting a first registration date for any domain found in the body of a message. If the registration date indicates that the weight is below a threshold (such as one month), the system may assign a lower trust value (e.g., zero) to this factor for the message, and a higher trust value (e.g., 1) to this factor for the message if the age is above the threshold. Optionally, multiple thresholds may be used, with different values assigned for domains that are above various thresholds (example: value=0 if the domain is less than one month old; value=0.5 if the domain is from one to six months old; or value=1 if the domain is over six months old).

Factor 2: The number of links found in a message and/or the number of domains associated with links in a message. The system may assign a trust value that corresponds to a function of either of these numbers, e.g., trust value=1 if no links or domains are found, trust value=0.5 if one link or domain is found, trust value=0.2 if two or more links are found.

Factor 3: The particular registrar with which each domain is registered. (For example, the system may maintain or have access to a data set identifying registrars that are more commonly associated with malicious messages than others, and registrars that are not commonly associated with malicious messages. The system may access a domain registrar service or a database of known domain registrations and issue a service call requesting the identity of a registrar for any domain found in the body of a message. The system may then determine whether a match for the identify is in the data asset, and if so, it may assign a value for this factor based on a measure of the extent to which the data set identifies the registrar as being known (or not known) to the associated with malicious websites. In this way, the system can maintain information about the reputations of registrars and use this information as a factor to determining a trust score for the message.

Factor 4: The number of levels of redirection associated with links in the message. A message with a larger number of links that correspond to redirections may be assigned a lower trust value for this factor, and be indicative of malicious messages. For example, the system may employ a redirect check tool to access an address associated with a link and determine whether the linked address employs a redirect to a different address. Different trust values may be assigned based on the number of redirected links that the message contains (example: value=1 if no redirect; value 0.5 if one redirect; or value=0 if two or more redirects).

Factor 5: The presence of IP-based URLs. Some malicious messages are hosted out of compromised computers, which may not have DNS entries. Thus, the presence of non-matching URLs in the body of a message (e.g. a link that displays as amazon.com but links to malicious_site-.com, such a link would look like <a href="malicious_site.com"> amazon.com </a>)), and the presence of links labeled "here", "link", or "click" that point to non-modal domains, namely domains other than the one of the sender of the message. Different trust values may be assigned based on the number of such URLs that the message contains (example: value=1 if no such URLs; value 0.5 if one such URL; or value=0 if two or more such URLs).

Factor 6: Whether the body of a message code contains certain code elements (e.g., HTML or javascript content) known to be commonly found in malicious messages. The system may do this by accessing a data set of known malicious message code, and determining whether one or more code elements of the message are in the data set. The system may assign a trust value to this factor that is a function of the number of known malicious code elements that the message contains (e.g., trust value=1 if no such code elements, trust value=0.5 if one or two such code elements, or trust value=0 if three or more such code elements).

Factor 7: Whether the message contains one or more attachments and whether such attachments contain malware. The system may perform a separate analysis to determine whether the attachment contains malware (e.g. by matching the file against malware signatures or opening the attachment in a sandboxed environment).

Factor 8: As another example, the system may identify a sender history—i.e., determine whether it has seen messages from the sender before based on stored data (such as a message log). If so, the system may determine whether one or more characteristics of the new message (e.g. headers, body, style, font, attachments, etc.) resemble the sender's previous messages. The system may do this by maintaining a data set of previously-received messages (or known senders) and comparing these elements of the received massage to the corresponding elements in the data set, and it may assign a value using an algorithm similar to that described above for other factors.

In some embodiments the system may calculate a score that is a sum, a weighted sum, or some other function of the factor-specific values determined using any or all of the above examples, optionally in addition with other criteria, such as those described below, and consider the message to be legitimate if the overall score exceeds a threshold.

Using a corpus of labeled malicious and legitimate messages, classifiers can be trained to use these features to distinguish between malicious and legitimate messages based on the value of these and other message features. These models can also be trained to incorporate linguistic elements and other features identified herein. Alternatively, rules to determine how to interpret the value of these features in determining whether a message is malicious or not can also be handcrafted (e.g. "if a message includes an attachment that contains malware, flag it as malicious", "if a message includes a link with more than 4 levels of re-direction, flag it as malicious").

In another example, one or more of the following identifying characteristics will be examined for a designation of a trusted external sender (partner), such as an external email: a X-header, an email body identifier (e.g. Known ID) in the body of the email, a domain name, the "From" header field, SPF, DMARC and DKIM. These characteristics could also be incorporated in the machine learning models discussed above.

Determining whether a user reported message is from a trusted sender may include determining whether the reported message satisfies one or more trusted sender rules using one or more of the aforementioned identifying characteristics, as are further explained in various embodiments below. In one embodiment, the system may retrieve an extension field of a header of the message, such as a X-header in an email message, to determine whether the field name of the header field matches a predetermined key. For example, the system may look for a header field "X-Mailer," and if successful, determine whether the value in the header field has a pre-determined known value. If the value in the header field matches the pre-determined known value, the system may determine that the message satisfies a trusted sender rule or that the message is from a trusted internal sender. In one embodiment, the pre-determined known value may be included in the programming instructions.

In an embodiment, the system may also extract various portions of a message and use those data to determine whether a message is from a trusted sender. For example, the system may examine the "From" field of an email and compare the value of the "From" field with a whitelist in a data store. If the value of the "From" field matches any item in the whitelist, the system determines that the message satisfies a trusted sender rule or that the message is from a trusted sender. In another example, the system may examine a domain found in an email and compare the value of the domain with a whitelist in a data store. If the value of each domain is found in the whitelist, the system determines that the message satisfies a trusted sender rule or that the message is from a trusted sender. In another example, the system may examine any portion of the email body and check whether the email body includes a predetermined known identifier. In one embodiment, the known identifier can be, for example, a special alphanumerical value such as a Known ID. In another embodiment, the known identifier can be of a particular known format, for example, a six-digit hexadecimal string. The predetermined known identifier can be included in the programming instructions in the system.

Alternatively, and/or additionally, the system may include a data store that contains a list of IP addresses or DNS names of servers that are authorized to send emails for a given domain. The system may identify a header field, such as "From" header field, and identify the domain name associated with the sender, such as an IP address or a DNS name, in the header field, and compare it with the data store to validate that at least one of the servers that were involved in the delivery of this mail are authorized to send mail for the domain of the from email address. If the IP address or the DNS name of the sender is validated, the system may determine that the message satisfies a trusted sender rule or that the message is from a trusted sender.

Alternatively, and/or additionally, the system may use Sender Policy Framework (SPF) to determine whether a message is from a trusted sender. In this embodiment, the system may identify an Internet protocol (IP) address in a header field of the header section, such as the "From" header field, and determine whether a SPF record has been published with a domain corresponding to the IP address. If the SPF record has been published with a domain corresponding to the IP address, the system may then determine that the message satisfies a trusted sender rule or that the message is from a trusted sender.

Alternatively, and/or additionally, the system may also use Domain Keys Identified Mail (DKIM) to determine whether a message satisfies a trusted sender rule. In this embodiment, the system may verify the value in the "DKIM-Signature" header field using DKIM. In another embodiment, the value in the "DKIM-Signature" header field may be encrypted, and the system may further obtain a public key and use the public key to verify the digital signature associated with the sender by using DKIM. If the verification succeeds, the system may determine that the message satisfies a trusted sender rule or that the message is from a trusted sender.

Alternatively, and/or additionally, the system may use Domain-based Message Authentication, Reporting & Conformance (DMARC) to determine whether a message is from a trust sender. In this embodiment, the system may identify the "From" header field of a header of the message and determine whether the value of the header field is aligned with an authenticated domain using DMARC. If an alignment is found, the system may determine that the message satisfies a trusted sender rule or that the message is from a trusted sender.

The system may use one or more of the trusted sender rules, or a combination there of, to determine whether a message is from a trusted source or trusted sender. In one embodiment, determining whether a message is from a trusted internal sender may include determining whether the message satisfies one or more trusted sender rules such as (1) a rule based on X-header alone, (2) a rule based on X-header, "From" header field and Domain, (3) a rule based on the email body identifier alone, or (4) a rule based on the email body identifier (e.g. Known ID), "From" header field and Domain. In another embodiment, determining whether the message is from a trusted external sender (partner) may include determining whether the message satisfies one or more trusted sender rules such as (1) a rule based on X-header alone, (2) a rule based on the email body identifier (e.g. Known ID) alone, (3) a rule based on X-header combined with (DKIM, SPF, or DMARC) and the email body identifier (e.g. Known ID), X-header combined with (DKIM, SPF, or DMARC), "From" header field and Dmain, (4) a rule based on X-header combined with (DKIM, SPF, or DMARC), and (5) a rule based on the email body identifier (Known ID) combined with (DKIM, SPF, or DMARC).

Returning to FIG. 2, when presenting a prompt to the user 210 after the system analyzes a message, the system may cause the prompt to include specific information about the message that will help the user understand why the system considered a message to be trusted, untrusted, and/or assigned to a particular class, and the system may output that information. For example, if a user highlighted a portion of a message that corresponds to one or more of the factors described above (e.g., a hyperlink, which may be used to assess the age of the hyperlink, whether the address of the hyperlink has a redirect, and/or whether the address of the hyperlink is associated with a trusted registrar or a registrar that is often associated with malicious websites), the system may return the information that it obtained when assessing these factors for the highlighted portion of and display this information (and optionally the corresponding trust values) to the user. Alternatively, the system may identify those portions of the message that corresponded to factors described above (e.g., hyperlinks or other message content), and display those portions along with the information that it obtained when assessing the factors for the identified portion (and optionally the corresponding trust values).

Returning to FIG. 1, in an embodiment, various functions of client computing device 103a . . . 103n can also be implemented in the cybersecurity analyzer 104 or on another remote device or by a remote service on the network. For example, once the client computing device receives a user notification indicating that the user has reported a malicious message, the client device may transmit the notification along with the message or various components of a message to a remote network device or cybersecurity analyzer for analysis. The remote device may analyze the user reported message and determine whether the message is legitimate, such as by being from a trusted sender, based on one or more rules using various embodiments described in this document. If the remote network device determines that the user reported message is from a legitimate, it may so notify the user with the analysis result. For example, the system may prompt the end user with customized and specific messages confirming that a reported email is from a trusted source and ask the user if the user is certain and wants to continue to report the email as malicious. Or, the system may also direct the user to take other actions (e.g. proceed with reading the email).

With further reference to FIG. 1, alternatively and/or additionally, the client computing device may also be configured to receive other messages such as regular emails and malicious emails that are not generated by the cybersecurity server. For example, the client computing device may receive any electronic messages, such as emails, and be configured to allow a user to report malicious messages and determine whether a reported malicious message is legitimate using various rules described in this document.

Figure 5:
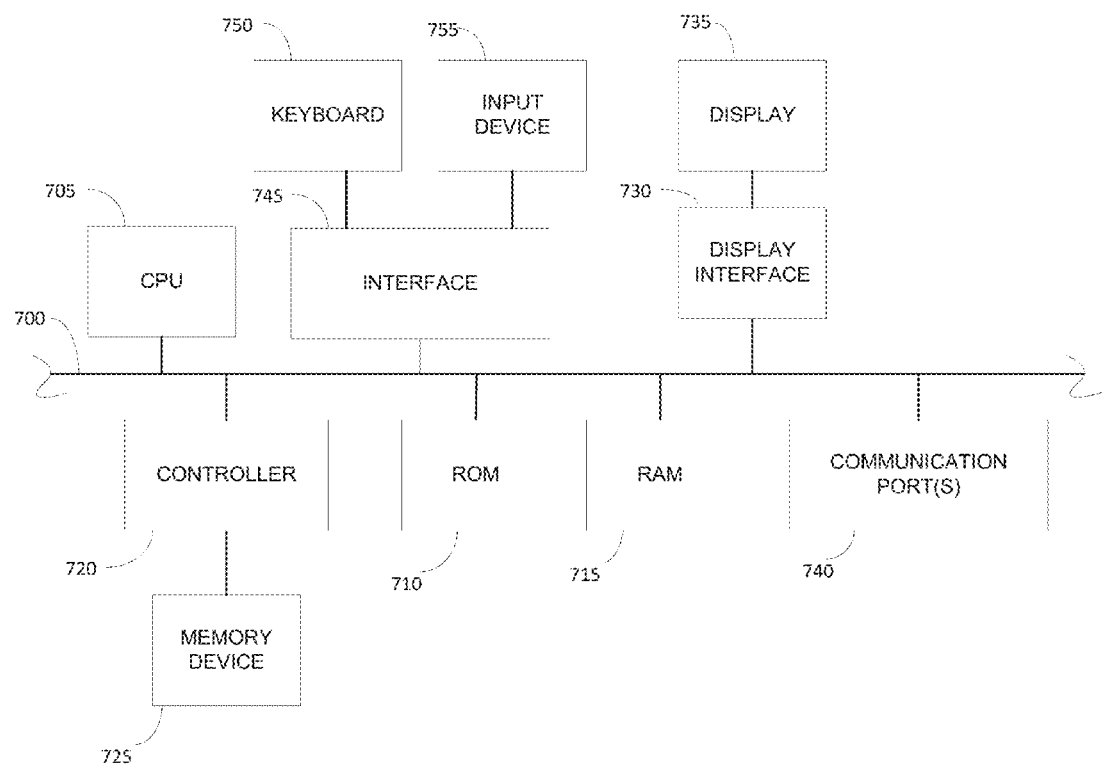
FIG. 5 depicts various embodiments of one or more electronic devices for implementing the various methods and processes described herein.

FIG. 5 depicts an example of internal hardware that may be used to contain or implement the various computer processes and systems as discussed above, such as the client computing devices, the message origination server and/or the cybersecurity analyzer server described above. Thus, any of the user electronic devices, servers, or computing devices discussed above may include some or all of the hardware architecture illustrated in FIG. 1. An electrical bus 700 serves as an information highway interconnecting the other illustrated components of the hardware. CPU 705 is a central processing unit of the system, performing calculations and logic operations required to execute a program. CPU 705, alone or in conjunction with one or more of the other elements disclosed in FIG. 5, is a processing device, computing device or processor as such terms are used within this disclosure. Read only memory (ROM) 710 and random access memory (RAM) 715 constitute examples of memory devices.

A controller 720 interfaces with one or more optional memory devices 725 that serve as data storage facilities to the system bus 700. These memory devices 725 may include, for example, an external DVD drive or CD ROM drive, a hard drive, flash memory, a USB drive or another type of device that serves as a data storage facility. As indicated previously, these various drives and controllers are optional devices. Additionally, the memory devices 725 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 710 and/or the RAM 715. Optionally, the program instructions may be stored on a tangible computer readable medium such as a compact disk, a digital disk, flash memory, a memory card, a USB drive, an optical disc storage medium, a distributed computer storage platform such as a cloud-based architecture, and/or other recording medium.

A display interface 730 may permit information from the bus 700 to be displayed on the display 735 in audio, visual, graphic or alphanumeric format. Communication with external devices may occur using various communication ports 740. A communication port 740 may be attached to a communications network, such as the Internet, a local area network or a cellular telephone data network.

The hardware may also include an interface 745 which allows for receipt of data from input devices such as a keyboard 750 or other input device 755 such as a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A non-malicious message identification and classification system of a cybersecurity network, the system comprising:
    a cybersecurity server comprising a cybersecurity server processor and programming instructions configured to cause the cybersecurity server processor to generate simulated phishing messages and send the simulated phishing messages to a client computing device;
    a computer-readable medium portion storing programming instructions that are configured to cause the client computing device to:
        receive an electronic message via a communications network, and
        receive a user notification that indicates that a user has reported the received message as a potentially malicious message; and a computer-readable medium portion storing programming instructions that are configured to cause the client computing device or a remote computing device to:
  determine whether the received message is a legitimate message or a potentially malicious message,
  in response to determining that the received message is a legitimate message, further analyze the received message to assign a class from a set of available classes to the received message, wherein:
    the available classes comprise a simulated phishing message class, a trusted internal sender class, and a trusted external sender class, and
    the assigned class is the simulated phishing message class, the trusted internal sender class, or the trusted external sender class, and
  in response to receiving the user notification and determining that the received message is a legitimate message, cause the client computing device to output a prompt to the user so that the prompt indicates that the message is a legitimate message and is associated with the assigned class, wherein:
    if the assigned class is the simulated phishing message class, then the prompt confirms that the user has properly reported the received message, and
    if the assigned class is either of the trusted internal sender class or the trusted external sender class, then the prompt conveys that the user has improperly reported the received message as a potentially malicious message so as to train the user.

2. The system of claim 1, wherein:
the programming instructions for determining whether the received message is a legitimate message or a malicious message comprise instructions to:
  select a structural element of the received message,
  obtain information corresponding to the structural element, and
  use the obtained information to assign a trust value to the structural element; and
the programming instructions to cause the client computing device to output the prompt also comprise instructions to present the user with the structural element and descriptive material corresponding to the obtained information, to train the user about how the structural element can help identify why the received message is a legitimate message.

3. The system of claim 2, wherein the programming instructions for selecting the structural element comprise programming instructions to receive a selection of the structural element with the received user notification.

4. The system of claim 2, wherein the programming instructions for obtaining information corresponding to the structural element comprise instructions to, if the structural element comprises a hyperlink, access a domain name registrar to retrieve information that indicates an age of a domain associated with the hyperlink.

5. The system of claim 2, wherein the programming instructions for obtaining information corresponding to the structural element comprise instructions to, if the structural element comprises a hyperlink, obtain the information corresponding to the structural element by:
  identifying a domain name registrar for a domain associated with the hyperlink; and
  accessing a data set of known domain name registrars to identify whether the registrar is known to register malicious websites.

6. The system of claim 2, wherein the programming instructions for obtaining information corresponding to the structural element comprise instructions to, if the structural element comprises a plurality of hyperlinks, determine a number of redirects associated with the plurality of hyperlinks.

7. The system of claim 1, wherein:
the instructions for assigning a class to the received message comprise instructions to, if the received message is one of the simulated phishing messages generated by the cybersecurity server, assign the simulated phishing message class to the received message.

8. The system of claim 7, wherein the instructions for assigning a class to the received message comprise instructions to determine that received message is one of the simulated phishing messages if:
  a header field of a header section of the received message starts with a predetermined key; and
  for any header field that starts with the predetermined key, that header field also includes a value that satisfies a first trusted sender rule.

9. The system of claim 1, wherein:
the instructions to assign a class to the received message further comprise instructions to, before assigning the simulated phishing message class to any received message, require that the received message satisfies at least two trusted sender rules.

10. The system of claim 9, wherein the at least two trusted sender rules comprise at least two of the following:
  a condition that at least one header field of a header section of the received message starts with a predetermined key, and for any header field that starts with the predetermined key, that header field also includes a value that is a known value or in a known format;
  a condition that any header field having a FROM fieldname include a value that is associated with a known sender;
  a condition that any header field having a domain name include a value that is associated with a known domain; or
  a condition that any header field having a FROM fieldname include a value that is associated with a known sender, and a condition that any header field having a domain name include a value that is associated with a known domain.

11. The system of claim 1, further comprising additional programming instructions that cause the client computing device to, before determining whether the received message is a legitimate message or a potentially malicious message:
  quarantine the received message; and
  release the received message from quarantine only after determining that the received message is a legitimate message and receiving a user acknowledgment of the prompt.

12. The system of claim 1, further comprising additional programming instructions that are configured to, in response to determining that the received message is a legitimate message, cause the client computing device to output a prompt for the user to confirm reporting of the received message.

13. A method of identifying and classifying a non-malicious messages in a cybersecurity reporting system, the method comprising:
  by a client computing device, receiving an electronic message via a communications network;
  by the client computing device, receiving a user notification that indicates that a user has reported the received message as a potentially malicious message;

by the client computing device or a remote computing device, implementing programming instructions that cause that computing device to:
    determine whether the received message is a legitimate message or a potentially malicious message,
    in response to determining that the received message is a legitimate message, further analyzing the received message to assign a class from a set of available classes to the received message, wherein:
        the available classes comprise a simulated phishing message class, a trusted internal sender class, and a trusted external sender class, and
        the assigned class is the simulated phishing message class, the trusted internal sender class, or the trusted external sender class, and
    in response to receiving the user notification and determining that the received message is a legitimate message, cause the client computing device to output a prompt to the user, wherein:
        the prompt indicates that the message is a legitimate message and is associated with the assigned class,
        if the assigned class is the simulated phishing message class, then the prompt confirms that the user has properly reported the received message, and
        if the assigned class is either of the trusted internal sender class or the trusted external sender class, then the prompt conveys that the user has improperly reported the received message as a potentially malicious message so as to train the user.

14. The method of claim 13, wherein:
determining whether the received message is a legitimate message or a malicious message comprises:
    selecting a structural element of the received message,
    obtaining information corresponding to the structural element, and
    using the obtained information to assign a trust value to the structural element; and
causing the client device to output the prompt also comprises:
    presenting the user with the structural element and descriptive material corresponding to the obtained information, to train the user about how the structural element can help identify why the received message is a legitimate message.

15. The method of claim 14, wherein selecting the structural element comprises receiving a selection of the structural element with the received user notification.

16. The method of claim 14, wherein:
the structural element comprises a hyperlink; and
obtaining information corresponding to the structural element comprises accessing a domain name registrar to retrieve information that indicates an age of a domain associated with the hyperlink.

17. The method of claim 14, wherein:
the structural element comprises a hyperlink; and
obtaining information corresponding to the structural element comprises:
    identifying a domain name registrar for a domain associated with the hyperlink,
    accessing a data set of known domain name registrars to identify whether the registrar is known to register malicious websites.

18. The method of claim 14, wherein:
the structural element comprises a plurality of hyperlinks; and
obtaining information corresponding to the structural element comprises determining a number of redirects associated with the plurality of hyperlinks.

19. The method of claim 13, further comprising:
by a cybersecurity server, generating a plurality of simulated phishing messages and sending the simulated phishing messages to a client computing device;
and wherein assigning the class to the received message comprises assigning the simulated phishing class to the received message if the client computing device determines that the received message is one of the simulated phishing messages generated by the cybersecurity server.

20. The method of claim 19, wherein determining that the received message is one of the simulated phishing messages comprises:
    determining whether any header field of a header section of the received message starts with a predetermined key;
    for any header field that starts with the predetermined key, further analyzing that header field to determine whether a value that follows the predetermined key satisfies a first trusted sender rule; and
    determining that the value that follows the predetermined key satisfies the first trusted sender rule.

21. The method of claim 13, wherein:
assigning a class to the received message further comprises, before assigning the simulated phishing message class to any received message, requiring that the received message satisfies at least two trusted sender rules.

22. The method of claim 21, wherein the at least two trusted sender rules comprise at least two of the following:
    a condition that at least one header field of a header section of the received message start with a predetermined key, and for any header field that starts with the predetermined key, that header field also includes a value that is a known value or in a known format;
    a condition that any header field having a FROM field-name include a value that is associated with a known sender;
    a condition that any header field having a domain name include a value that is associated with a known domain; or
    a condition that any header field having a FROM field-name include a value that is associated with a known sender, and a condition that any header field having a domain name include a value that is associated with a known domain.

23. The method of claim 13, further comprising, before determining whether the received message is a legitimate message or a potentially malicious message:
    quarantining the received message; and
    releasing the received message from quarantine only after determining that the received message is a legitimate message and receiving a user acknowledgment of the prompt.

24. The method of claim 13, further comprising, by the client computing in response to determining that the received message is a legitimate message, causing the client computing device to output a prompt for the user to confirm reporting of the received message.

* * * * *

UNITED STATES PATENT AND TRADEMARK OFFICE
CERTIFICATE OF CORRECTION

PATENT NO. : 9,774,626 B1  
APPLICATION NO. : 15/239668  
DATED : September 26, 2017  
INVENTOR(S) : Alan Himler et al.

Page 1 of 1

It is certified that error appears in the above-identified patent and that said Letters Patent is hereby corrected as shown below:

On the Title Page

Item [57]:

Line 4 in the first sentence, the word --a-- is hereby inserted between the phrases "received message as" and "potentially malicious.".

Line 2 in the second sentence, the word "a" that appears between the phrase "the message is" and the word "legitimate" is hereby removed.

Line 9 in the second sentence, the words "training a" that appear between the word "or" and the phrase "simulated phishing message" are hereby removed.

In the Claims

In Claim 1, Column 17, Line 5: "or-a" is hereby changed to "or a".

In Claim 24, Column 20, Line 61: --device-- is hereby inserted after "the client computing".

Signed and Sealed this  
Fourteenth Day of November, 2017

Joseph Matal  
*Performing the Functions and Duties of the  
Under Secretary of Commerce for Intellectual Property and  
Director of the United States Patent and Trademark Office*